United States Patent
Roth et al.

(10) Patent No.: US 6,361,018 B2
(45) Date of Patent: Mar. 26, 2002

(54) COAXIAL VALVE WITH ELECTRIC ACTUATING DRIVE

(75) Inventors: Martin Roth, Taufkirchen; Arno Voit, Haushaum; Gerd Bethe, Ottobrunn, all of (DE)

(73) Assignee: Astrium GmbH, Munich (DE)

( * ) Notice: Subject to any disclaimer, the term of this patent is extended or adjusted under 35 U.S.C. 154(b) by 0 days.

(21) Appl. No.: 09/738,955

(22) Filed: Dec. 15, 2000

(30) Foreign Application Priority Data

Dec. 15, 1999 (DE) .......................... 199 60 330

(51) Int. Cl.[7] .............................. F16K 31/02; F16K 1/00
(52) U.S. Cl. ..................... 251/129.2; 251/235; 251/344
(58) Field of Search ............................. 251/129.2, 235, 251/343, 344

(56) References Cited

U.S. PATENT DOCUMENTS

| | | | | |
|---|---|---|---|---|
| 3,085,397 A | * | 4/1963 | Jubb et al. ............... | 251/344 X |
| 3,475,001 A | * | 10/1969 | Hieber ..................... | 251/344 X |
| 3,603,559 A | * | 9/1971 | Totten ..................... | 251/129.2 |
| 3,685,536 A | * | 8/1972 | Bake et al. ............. | 251/344 X |
| 4,294,286 A | | 10/1981 | Ohumi | |
| 4,948,091 A | * | 8/1990 | Satoh et al. ......... | 251/129.2 X |
| 5,020,727 A | * | 6/1991 | Smith ..................... | 251/343 X |
| 5,735,501 A | | 4/1998 | Maurer et al. | |
| 5,799,696 A | * | 9/1998 | Weiss .................. | 251/129.2 X |
| 5,810,089 A | * | 9/1998 | Mack ..................... | 251/344 X |
| 6,116,571 A | * | 9/2000 | Gerhard .................. | 251/129.2 |

FOREIGN PATENT DOCUMENTS

| | | |
|---|---|---|
| DE | 3933169 | 4/1991 |
| DE | 29706688 | 8/1997 |
| EP | 0257906 | 3/1988 |
| EP | 0743476 | 11/1996 |

* cited by examiner

Primary Examiner—Henry C. Yuen
Assistant Examiner—Eric Keasel
(74) Attorney, Agent, or Firm—W. F. Fasse; W. G. Fasse

(57) ABSTRACT

A coaxial valve includes an actuating drive, a valve housing (11), a valve sleeve (12) that is longitudinally slidable in the valve housing (11) between open and closed positions, and a closing body (13) arranged coaxially at one end of the valve sleeve (12). In the closed position, the valve sleeve seals against the closing body. In the open position, the valve sleeve is spaced from the closing body, to open a valve opening cross-section (V). The actuating drive includes an electric servomotor (21) with a linear actuator (22), and a transmission mechanism (30) for transmitting the linear movement of the actuator to the valve sleeve. The transmission mechanism includes a rocker lever with a first end articulately connected to the linear actuator, a second end articulately connected to the valve housing, and a middle section articulately connected to the valve sleeve.

17 Claims, 2 Drawing Sheets

COAXIAL VALVE WITH ELECTRIC ACTUATING DRIVE

FIELD OF THE INVENTION

The invention relates to a coaxial valve for regulating and shutting off the flow of a fluid or gaseous flow medium.

BACKGROUND INFORMATION

There are particularly stringent requirements for valves which are used for regulating and shutting off liquid or gaseous flow media under extreme conditions such as chemical aggressiveness, very high or very low temperatures or very high pressures. Propulsion in aircraft and spacecraft is one field of application of valves used for shutting off a liquid or gaseous medium under extreme conditions. In such applications, the valves are subjected not only to extreme high and low temperatures but also to extreme temperature changes. In the case of valves for liquid and gaseous rocket fuels, there are further parameters such as high mass flow rates, high pressures and short switching times (opening, closing, positioning).

For use in particular in aerospace applications, a coaxial valve is used for shutting off a liquid or gaseous flow medium, comprising a valve housing, a valve sleeve, and a closing body. The valve housing has an inlet and an outlet for the medium to be shut off. The valve sleeve is arranged in the valve housing in an axial direction between an open position and a closed position, whereby the valve sleeve is slidable in a longitudinal direction of the valve housing between the open and closed positions for the purpose of opening or shutting off the flow of the medium. The medium to be shut off flows in the longitudinal direction through the valve sleeve when the valve is open. The closing body is arranged at one end of the valve sleeve coaxially thereto. The valve sleeve rests against the closing body in the closed position so as to provide a seal, and on the other hand, with the valve sleeve in the open position, the valve sleeve is spaced at a distance from the closing body for freeing a valve opening cross section therebetween. Such a coaxial valve further comprises an actuating drive for opening and closing the valve.

Up to now, valves of the above described type comprised a pneumatically operated actuating drive. A pneumatic system such as the actuating drive of a valve has the disadvantage in that it is very complex, is associated with the danger of leakage, and in particular in aerospace applications is problematic in view of the high reliability which is required. Possible leakage is conducted away separately in a connecting line.

Helium is used as a pressure means (control fluid) which is used primarily as a seal gas between the hot and the cold flow (turbine propellant gas/fuel) in the turbopumps and during such use is consumed due to leakage losses. It can thus happen that toward the end of a mission there is no longer any helium left for operating the valves. A further disadvantage is the expenditure in design, weight and cost, required for the helium pipe system and regulating system to which each fuel valve has to be connected. Such systems also pose problems concerning their reliability. Since a compressible gas is used as a pressure medium, the actuation movement of a valve can only be very coarsely influenced from a time-related and kinematic point of view. Only an open position and a closed position are possible, both against an end stop. Defined intermediate positions and precise control movements are practically impossible.

German Utility Model DE 297 06 688 U1 discloses a coaxial valve as mentioned above, further including a transmission part in the form of a lever or an articulated lever which is used as a connection between an actuator and a valve sleeve and which causes displacement of the valve sleeve in the coaxial valve. In this arrangement, the transmission part interacts on one side with the valve sleeve. With such an arrangement there is an inherent danger that due to the one-sided application of force, the valve sleeve may jam in the coaxial valve. This is particularly fatal for applications where maintenance of the coaxial valve is not possible or possible only at considerable expense, such as for example during the extreme conditions mentioned in the introduction.

European Patent Application Publication EP-OS 0 257 906 discloses various embodiments of seat valves in which the axially-movable seat body is driven by an electric motor via a spindle/nut arrangement. The emphasis has been placed on achieving as compact a design of the valve housing as possible. This has been achieved in that the rotor of the electric motor largely makes use of the cross section of the flow channel, with the rotor itself being located in the flow stream of the conveying medium. In this way, the external diameter of the valve housing corresponds approximately to the external diameter of the adjoining pipelines. Such an arrangement is however associated with considerable disadvantages. The units (bearing, rotor, gearing) which are incorporated directly in the flow channel, considerably impair the flow, so that considerable losses in pressure have to be anticipated. Depending on the physical characteristics of the flowing medium, large friction moments act on the rotating rotor, so that an unnecessarily increased amount of power is required to drive it. Aggressive flow media can chemically/physically attack bearings, rotor and gearing, and thus considerably shorten their useful life. Consequently, such a valve design is only suitable for non-aggressive media of low viscosity, where the throughput is relatively small.

SUMMARY OF THE INVENTION

It is an object of the present invention to provide a control valve, in particular for cryogenic and aggressive rocket fuels, which is particularly flow-enhancing, relatively simple and compact in design, and which has a drive that is not located in the conveyed flow medium. Furthermore, the drive should be arranged so as to be largely thermally decoupled, and it should consume as little power as possible. In addition, operation of the control valve is to be as troublefree as possible. The invention further aims to avoid the disadvantages of the prior art, and to achieve additional advantages, as apparent from the present specification.

The above objects have been achieved according to the invention in a coaxial valve for regulating and shutting-off the flow of a liquid or gaseous flow medium. The valve comprises a valve housing with an inlet and an outlet connected by a flow passage for the liquid or gaseous medium, and a valve sleeve that is arranged in the housing (in the flow passage) axially between an open position and a closed position, so as to be slidable in a longitudinal direction between the open position for allowing the medium to flow in the longitudinal direction through the valve sleeve, and the closed position for shutting off the flow of the medium. The valve further comprises a closing body that cooperates with the valve sleeve to selectively achieve the closure seal or the open flow passage through the valve. Particularly, on the one hand the valve sleeve rests against the closing body in the closed position to provide a seal, and on the other hand, when the valve sleeve is in the open position, the sleeve is spaced at a distance away from the closing body so as to free a valve opening cross-section. The present valve further comprises an actuating drive for opening and closing the valve by sliding the valve sleeve selectively in the longitudinal direction between the open position and the closed position and/or to any desired intermediate partial-open position therebetween.

Particularly according to the invention, the actuating drive comprises a rotational electric servomotor including a linear actuator, and a transmission part or mechanism coupled between the linear actuator and the valve sleeve so as to transmit the linear movement of the linear actuator to the valve sleeve. The transmission part or mechanism comprises an adjusting lever embodied as a rocking lever that extends in a direction generally transverse relative to the longitudinal direction of motion of the valve sleeve. A first end of the rocking lever or adjusting lever is articulately connected by a drive bearing to the linear actuator of the servomotor, while the second end of the adjusting lever is articulately coupled by a locating bearing to the valve housing, and a middle section of the adjusting lever between the first and second ends is articulately connected by an actuator bearing to the valve sleeve. With such an arrangement, the adjusting lever transmits the linear motion of the linear actuator of the servomotor to a linear motion of the valve sleeve, while accurately transmitting the driving force along the linear path of the motion of the valve sleeve and avoiding alignment errors and the like between the valve axis and the drive axis. The two opposite ends of the adjusting lever are slidable and articulated respectively in the drive bearing and the locating bearing, while the middle section of the adjusting lever is articulated via the actuator bearing to the valve sleeve.

One advantage of the coaxial valve according to the invention is its high reliability even under extreme conditions. A further advantage consists of one valve sleeve being pressure-equalized, thus requiring only modest actuating power. Another advantage consists of its flow shape with the seal seat being easily adjustable and exchangeable.

A further advantage of the coaxial valve according to the invention consists of it being steplessly adjustable with high precision between the open position and the closed position. Yet another advantage consists of its actuating time between the open position and the closed position or from a defined position to another defined position being freely selectable. A still further advantage of the coaxial valve according to the invention consists of it being electrically controllable in a simple way. There is another advantage in that, in contrast to pneumatically controlled valves, no leakage problems can occur. Furthermore, it is a significant advantage of the coaxial valve according to the invention in that it can easily be electrically implemented in various environments. No screws can fall into the flow medium space, and the coaxial valve can easily be flushed out with gas. In this way, the danger of freezing during operation with cryogenic media can be avoided.

The special type of the adjusting lever in the form of a rocking lever and the way it is held and arranged, in particular via coupling with the valve sleeve in a middle region, reduces the danger of the valve sleeve jamming. This is because, in contrast to the prior art, impingement or coupling of force on the valve sleeve so as to move the valve sleeve is now not merely on one side, but instead the coupling of drive forces onto the valve sleeve from several sides is possible.

De-coupling of the electric drive from radial pressure and shrinking forces is ensured. Furthermore, constraining forces as a result of alignment errors between the valve axis and the drive axis are avoided.

A preferred embodiment of the invention provides for the actuator of the servomotor to be movable co-linear or parallel to the longitudinal direction of displacement of the valve sleeve.

Another preferred embodiment of the invention provides for the actuator bearing to comprise an actuator cog or journal pin provided on the exterior of the valve sleeve, and a bearing bore that is provided in or on the adjusting lever and that accommodates the actuator cog therein. In this arrangement, the force is introduced over a large area into the thin-walled sliding sleeve. Also, manufacturing expense is reduced due to a simple shape and a reduced number of parts.

An alternative embodiment provides for the actuator bearing to be formed by a ball surface provided on the exterior of the valve sleeve, and by a socket surface provided on the adjusting lever, whereby the socket surface accommodates the ball surface.

A preferred improvement of the invention provides for the adjusting lever in the region of the actuator bearing to be configured so as to surround the valve sleeve, e.g. with two portions of the lever extending respectively around opposite sides of the valve sleeve. On each side of the valve sleeve, a respective bearing bore accommodating a respective actuator cog, is provided in the adjusting lever.

According to one embodiment of the invention, the drive bearing comprises a bearing ball provided at one end of the adjusting levers and a bearing socket provided on the actuator of the servomotor.

According to a further embodiment, the locating bearing comprises a bearing ball provided at the other end of the adjusting lever, and a bearing socket provided in the valve housing. In addition, the locating bearing may comprise spring elements. The bearing may e.g. be pre-tensioned in one direction via leaf springs which are attached between the housing and the socket. These springs make it possible to obtain cushioning when moving against the limit position as well as to obtain temperature-compensated length equalization, thus maintaining shutoff power, as well as reinforcement or supplementation of the opening movement as a result of the energy stored in the springs. The locating bearing of the coaxial valve may comprise spring elements also so as to compensate for materials shrinkage and tolerances.

Preferably pressure-equalized retention of the valve sleeve in the coaxial valve is provided. Due to such pressure-equalization of the valve, the pressure of the flow medium has no direct influence on the hydraulic power of the valve sleeve.

Furthermore, encapsulation of the valve or the drive may be provided. This provides protection against explosion in the case of gaseous media. Material present as a result of leaks due to improper sealing can be removed from the valve in a controlled way, with the valve also being suitable for aggressive media such as for example MMH and $N_2O_4$ (storable fuels).

The valve according to the invention has the advantage that it is "scaleable", i.e. in that the valve can be made in all sizes without principle changes.

Advantageously, the coaxial valve according to the invention is used for temperatures of the flow medium from 3 K (for liquid helium) to 350 K. Furthermore, the coaxial valve according to the invention is advantageously used for pressures of the flow medium of up to 290 bar.

Regulating and shutting off liquid or gaseous flow media, in particular cryogenic, i.e. deep-frozen, media for propulsion of aircraft or spacecraft is a preferred field of application of the coaxial valve according to the invention. Throughout this specification, the term "flow media" is intended to cover all liquid or gaseous media that may selectively flow through or be shut-off by the present valve.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
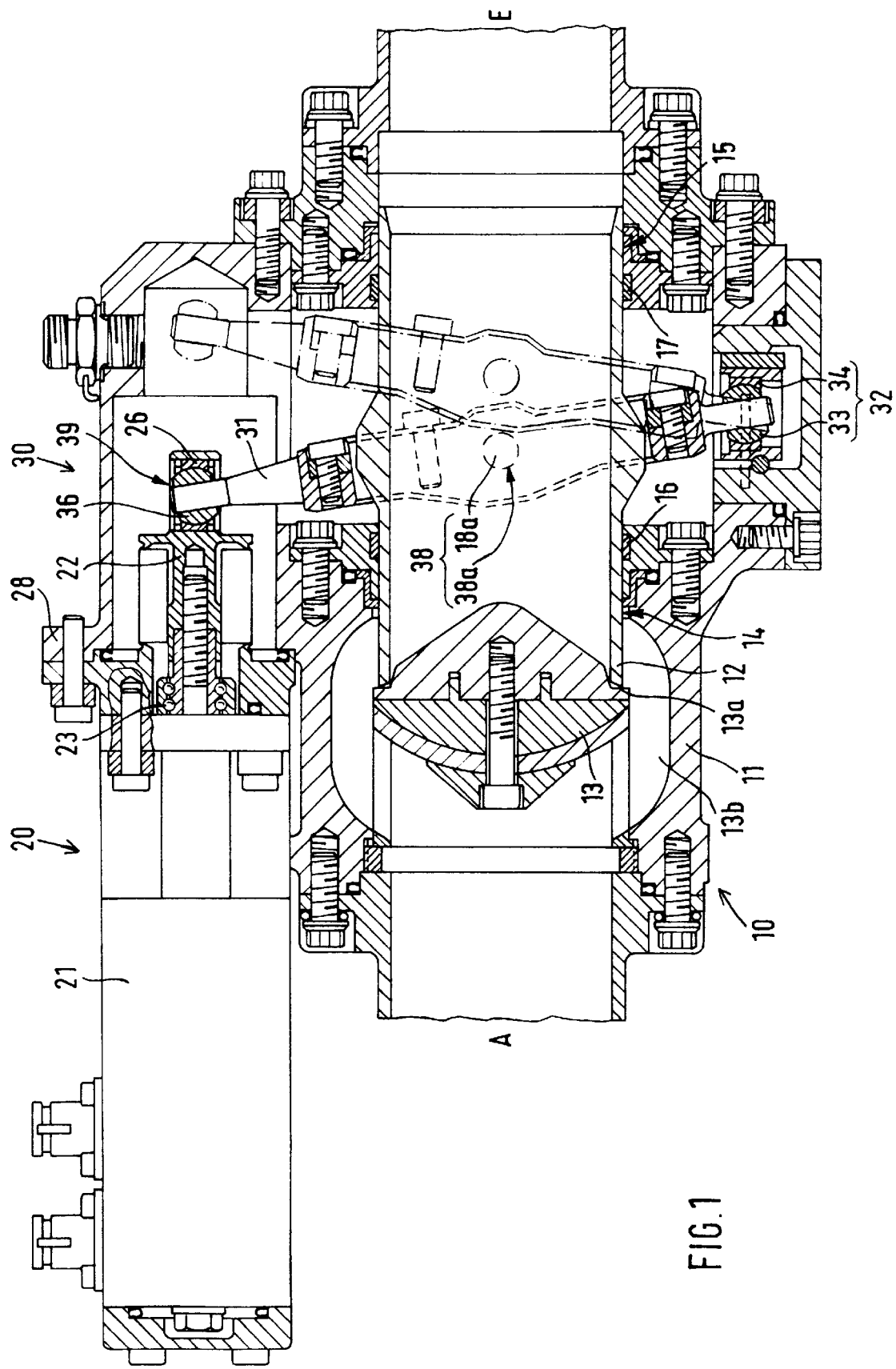
FIG. 1 is a cross-sectional view of a coaxial valve for shutting off and regulating a liquid or gaseous flow medium according to a first embodiment of the invention.
Figure 2:
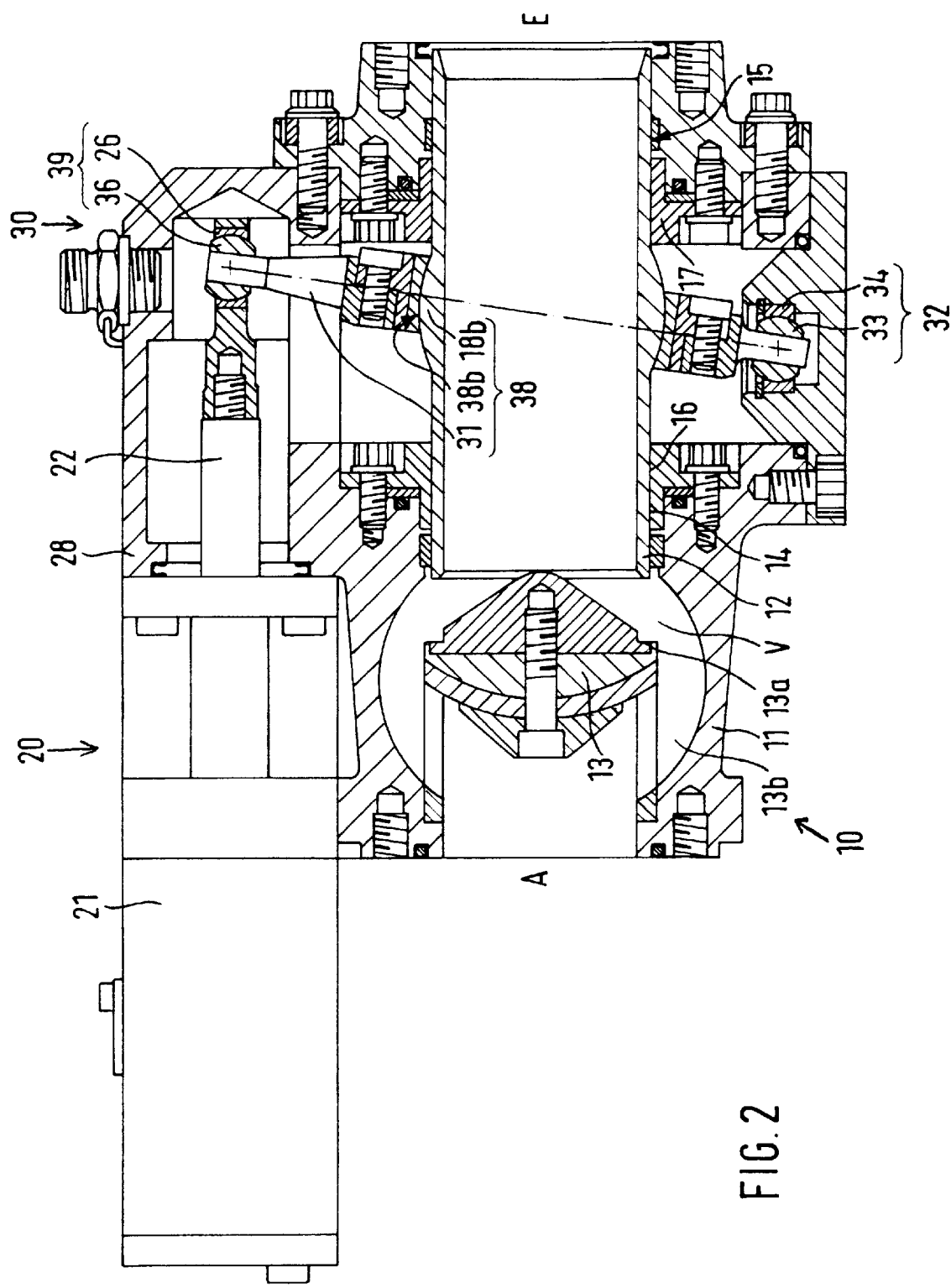
FIG. 2 is a cross-sectional view of a coaxial valve for shutting off and regulating a liquid or gaseous flow medium according to a second embodiment of the invention.

FIGS. 1 and 2 show two embodiments of the coaxial valve according to the invention. The coaxial valve generally comprises a hydraulic part or valve body 10, an electric linear drive 20, and a transmission part or mechanism 30.

The hydraulic part 10 includes a valve sleeve 12 arranged in a valve housing 11. The valve sleeve 12, in an axial direction, is arranged and longitudinally slidable between an open position in which an open flow passage is provided through the valve housing 11, and a closed position closing off the flow passage in relation to the valve housing 11. The longitudinal slidability and sealing arrangement of the valve sleeve 12 in relation to the valve housing 11 is achieved by bearing surfaces 14, 15 provided on the exterior of the valve sleeve 12, cooperating with slide-thrust bearings 16, 17 with slide seals provided in the valve housing 11. At one end of the valve sleeve 12, a closing body 13 is arranged coaxially to the valve sleeve 12, with the closing body 13 being contoured at its side facing the valve sleeve 12, for example cone-shaped, and comprising a valve seat area 13a interacting with the end of the valve sleeve 12 so as to provide a seal. The closing body 13 is fixed in the flow passage within the housing, e.g. by a spider arrangement.

The closing body 13 is surrounded by a flow chamber 13b by way of which the liquid or gaseous flow medium can flow around the closing body 13 when the valve is open. The valve sleeve 12 and the closing body 13 are arranged coaxially in a flow path leading from an inlet E to an outlet A of the coaxial valve. In the closed position of the coaxial valve, the valve sleeve 12 rests against the valve seat area 13a of the closing body 13, as shown in FIG. 1. In the open position of the valve, the valve sleeve 12 is spaced apart from the closing body 13 while freeing a valve aperture cross-section V, as shown in FIG. 2.

The actuating drive formed by the electric linear drive 20 of the coaxial valve comprises a servomotor 21 which is fixed to the valve housing 11 via a motor mounting 28, as well as a linear actuator 22 with a linear movement, whereby a screw with a recirculating ballnut assembly or a planetary ballnut assembly 23 translates the rotary movement of the servomotor 21 to a back-and-forth linear movement of the actuator 22. The actuator 22 of the servomotor 21 is movable in the valve housing 11 collinear or parallel to the direction of the sliding displacement of the valve sleeve 12, i.e. parallel to the longitudinal direction in which the valve sleeve 12 moves.

The transmission part or mechanism 30 is used to transmit the linear movement of the actuator 22 to the valve sleeve 12. The transmission part 30 comprises an adjusting lever 31 extending transversally to the direction of displacement of the valve sleeve 12. The adjusting lever 31 is coupled both to the actuator 22 of the servomotor 21 and to the valve sleeve 12. The adjusting lever 31 is a rocking lever. At a first end thereof, the adjusting lever 31 comprises a drive bearing 39, coupled to the actuator 22 of the servomotor 21 so as to be articulated and slidable. At the opposite second end thereof the adjusting lever 31, in a locating bearing 32, comprises spring elements (not shown). Thereby, the second end of the adjusting lever 31 is coupled to the valve housing 11 so as to be articulated. In a middle region of the adjusting lever between the two opposite ends thereof, the adjusting lever 31 is coupled to the valve sleeve 12 via an actuator bearing 38, so as to be articulated thereto.

When opening and closing the coaxial valve, the adjusting lever 31, as a result of the linear movement of the actuator 22 of the servomotor 21, carries out a swivel motion around the locating bearing 32 between two extreme positions which are both shown in FIG. 1. One of the positions (shown in dash-dotted lines) corresponds to the completely open state of the coaxial valve while the other position (shown in solid lines for parts visible in the sectional view and dashed lines for hidden parts) of the valve sleeve 12 shown in FIG. 1 corresponds to the completely closed position. FIG. 2 shows the open position of the valve.

The drive bearing 39 establishing the connection to the actuator 22 of the servomotor 21 comprises a bearing ball 36 provided on the first end of the adjusting lever 31 and a bearing socket 26 provided on the actuator 22 of the servomotor 21. The locating bearing 32 establishing the connection to the valve housing 11 comprises a bearing ball 33 provided on the opposite second end of the adjusting lever 31 and a bearing socket 34 provided in the valve housing 11.

In the embodiment shown in FIG. 1, the actuator bearing 38 establishing the connection of the middle section of the adjusting lever 31 with the valve sleeve 12, comprises an actuator cog or journal pin 18a provided on the exterior of the valve sleeve 12, and a bearing bore 38a provided in the adjusting lever 31 and accommodating the actuator cog 18a. In the region of the actuator bearing 38, the adjusting lever 31 is shaped so as to surround the valve sleeve 12. Namely, two arms or legs of the lever 31 form a yoke around the sleeve 12. Respective bearing bores 38a are provided in the two arms or legs of the adjusting lever 31 on both sides of the valve sleeve 12, with one actuator cog or journal pin 18a located on each side of the valve sleeve 12 and respectively received in the bearing bore 38a in the lever arm on that side of the sleeve.

In the embodiment shown in FIG. 2, the actuator bearing 38 connecting the middle region of the adjusting lever 31 with the valve sleeve 12 comprises a ball surface 18b provided on the exterior of the valve sleeve 12 (e.g. directly integrally formed on the exterior of the valve sleeve 12 or non-integrally affixed thereon), and a socket surface 38b formed on the adjusting lever 31 and accommodating the ball surface 18b therein. The adjusting lever 31 is again formed in the region of the actuator bearing 38 in a way so as to surround the valve sleeve 12, with the socket surface 38b accommodating the ball surface 18b provided on the exterior of the valve sleeve 12, in the region of the adjusting lever 31 surrounding the valve sleeve 12.

The present coaxial valve is advantageous in particular for shutting off gaseous or liquid flow media at temperatures from 20 K to 350 K and at pressures up to 290 bar, and is particularly advantageous for shutting off liquid or gaseous flow media for propulsion of aircraft and spacecraft, i.e. flying craft.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A coaxial valve for controlling a flow of a liquid or gaseous flow medium therethrough, comprising:
   a valve housing with an inlet, an outlet and a flow passage passing in a longitudinal direction therethrough from said inlet to said outlet;
   a closing body arranged in said flow passage in said housing;
   a valve sleeve slidably arranged in said flow passage so as to be slidable in said longitudinal direction between a closed position in which said valve sleeve contacts and seals against said closing body to close said flow passage and an open position in which said valve sleeve is spaced a distance apart from said closing body to open a valve flow opening between said valve sleeve and said closing body and allow the flow medium to flow from said inlet, through said valve sleeve in said longitudinal direction, through said valve flow opening and out of said outlet;
   an actuating drive including an electric servomotor and a linear actuator coupled to said servomotor and adapted to output a linear actuating motion; and
   a transmission mechanism connected between said linear actuator and said valve sleeve and adapted to transmit the linear actuating motion from said linear actuator to said valve sleeve;
   wherein said transmission mechanism comprises a rocker lever that extends transversely relative to said longitudinal direction and that includes a first end, a second end opposite said first end, and a middle section between said first and second ends; and
   wherein said transmission mechanism further comprises a drive bearing that articulately couples said first end of said rocker lever with said linear actuator, a locating bearing that articulately couples said second end of said rocker lever with said valve housing, and an actuator bearing that articulately couples said middle section of said rocker lever with said valve sleeve.

2. The coaxial valve according to claim 1, wherein said linear actuator is arranged and oriented so that said linear actuating motion is parallel to said longitudinal direction in which said valve sleeve is slidable.

3. The coaxial valve according to claim 1, wherein said actuator bearing comprises a bearing bore provided in said middle section of said rocker lever, and an actuator journal pin that protrudes outwardly from said valve sleeve and is received in said bearing bore.

4. The coaxial valve according to claim 1, wherein said actuator bearing comprises a socket surface provided at said middle section of said rocker lever, and a ball surface that is provided on an exterior of said valve sleeve and is received in said socket surface.

5. The coaxial valve according to claim 1, wherein said middle section of said rocker lever comprises two lever portions that respectively extend around opposite sides of said valve sleeve, so that said valve sleeve passes through said middle section of said rocker lever, and said rocker lever surrounds said valve sleeve.

6. The coaxial valve according to claim 5, wherein said actuator bearing comprises two bearing bores respectively provided in said two lever portions respectively at said opposite sides of said valve sleeve, and two actuator journal pins that respectively protrude outwardly from said two opposite sides of said valve sleeve and are respectively received in said bearing bores.

7. The coaxial valve according to claim 5, wherein said actuator bearing comprises a socket formed of inner surfaces of said two lever portions facing inwardly toward and surrounding said valve sleeve, and a ball surface that is provided on an exterior of said valve sleeve and is received in said socket.

8. The coaxial valve according to claim 1, wherein said drive bearing comprises a bearing socket provided on said linear actuator, and a bearing ball that is provided on said first end of said rocker lever and is received in said bearing socket.

9. The coaxial valve according to claim 1, wherein said locating bearing comprises a bearing socket provided in said valve housing, and a bearing ball that is provided on said second end of said rocker lever and is received in said bearing socket.

10. The coaxial valve according to claim 1, wherein said locating bearing comprises at least one spring element interposed between said second end of said rocker lever and said valve housing.

11. The coaxial valve according to claim 1, wherein said valve sleeve is arranged and retained in said valve housing in a pressure-equalized manner so that the flow medium does not exert any influence on said slidability of said valve sleeve in said longitudinal direction in said valve housing.

12. The coaxial valve according to claim 1, wherein said housing provides a complete encapsulation, and said valve further comprises slide seals between said valve sleeve and said housing to seal the flow medium in said valve sleeve and said flow passage of said housing.

13. The coaxial valve according to claim 1, being able to withstand temperatures of the flow medium from 3K to 350K.

14. The coaxial valve according to claim 1, being able to withstand pressures of the flow medium up to 290 bar.

15. A combination of the coaxial valve according to claim 1 and a flying craft.

16. A combination of the coaxial valve according to claim 1 and the flow medium, wherein said flow medium is at a temperature in a range from 3K to 350K.

17. A combination of the coaxial valve according to claim 1 and the flow medium, wherein said flow medium is at a pressure of 290 bar.

* * * * *